Feb. 21, 1967   J. P. R. RODALLEC   3,304,763
CONICAL-MOTION TESTING MACHINES
Filed April 21, 1964   4 Sheets-Sheet 2
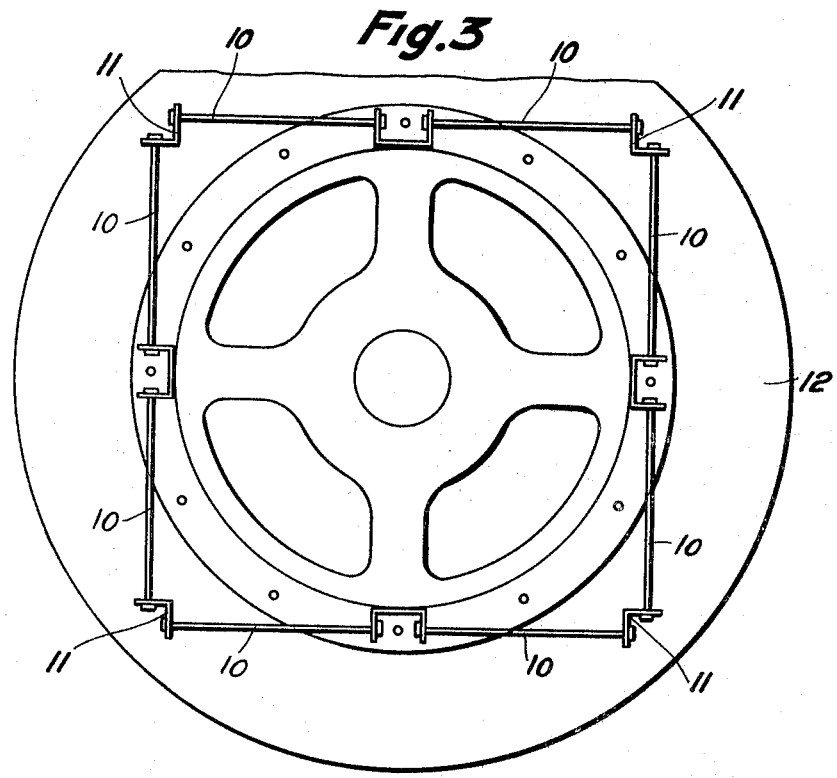
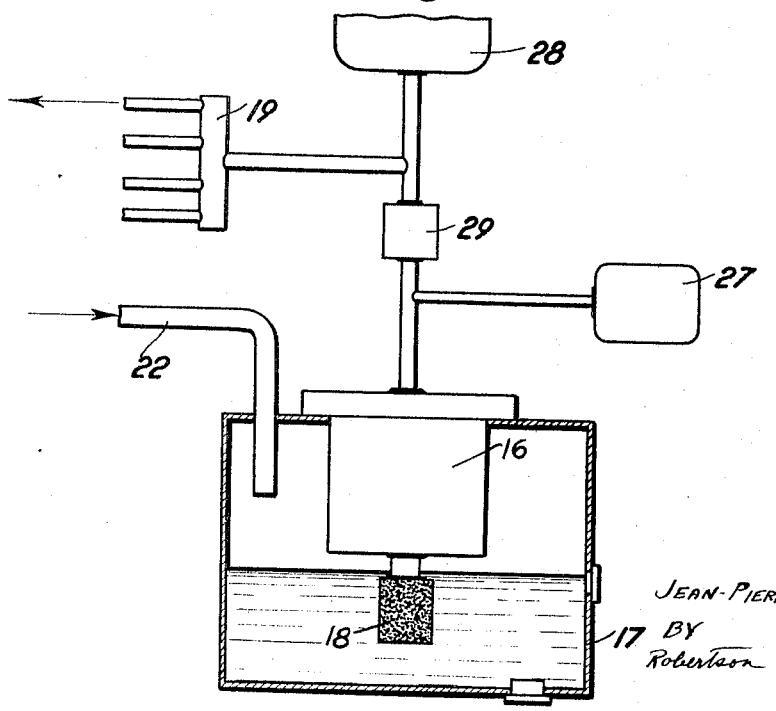
INVENTOR
JEAN-PIERRE RENÉ RODALLEC
BY
Robertson Smythe & Bryan
ATTORNEYS

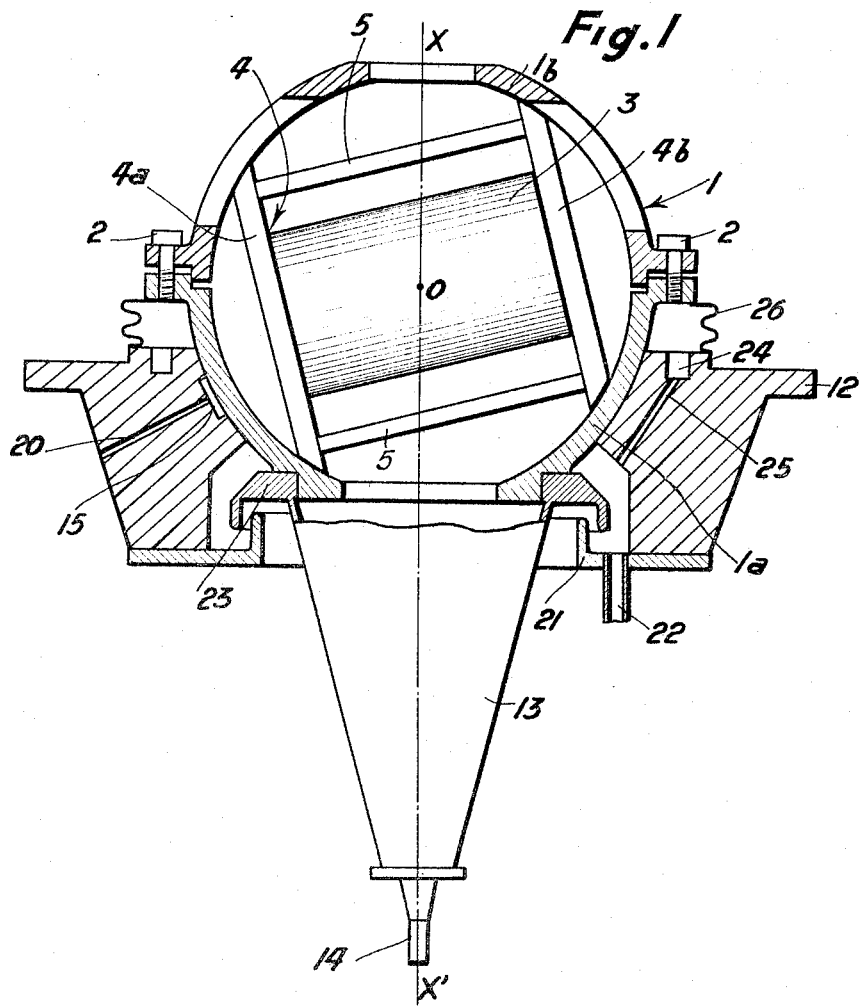
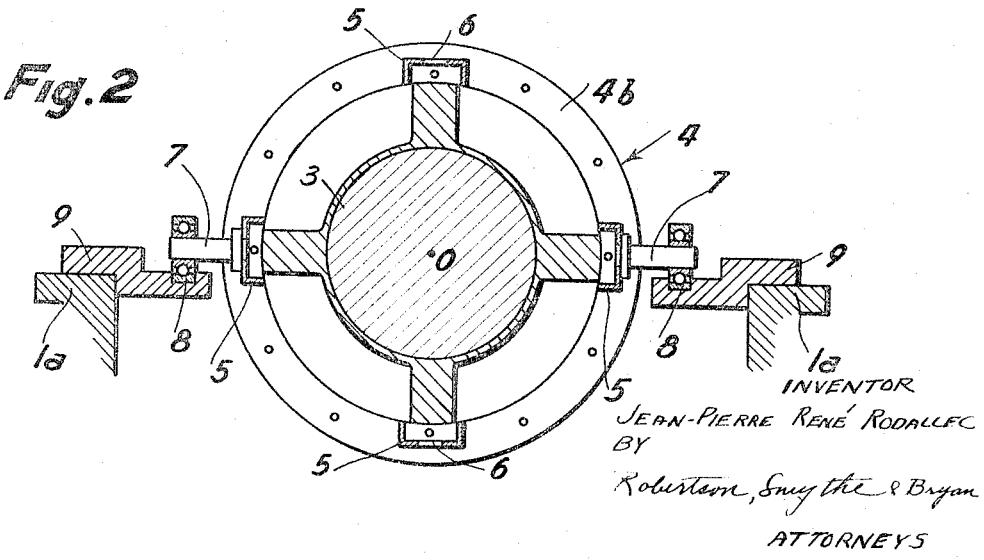

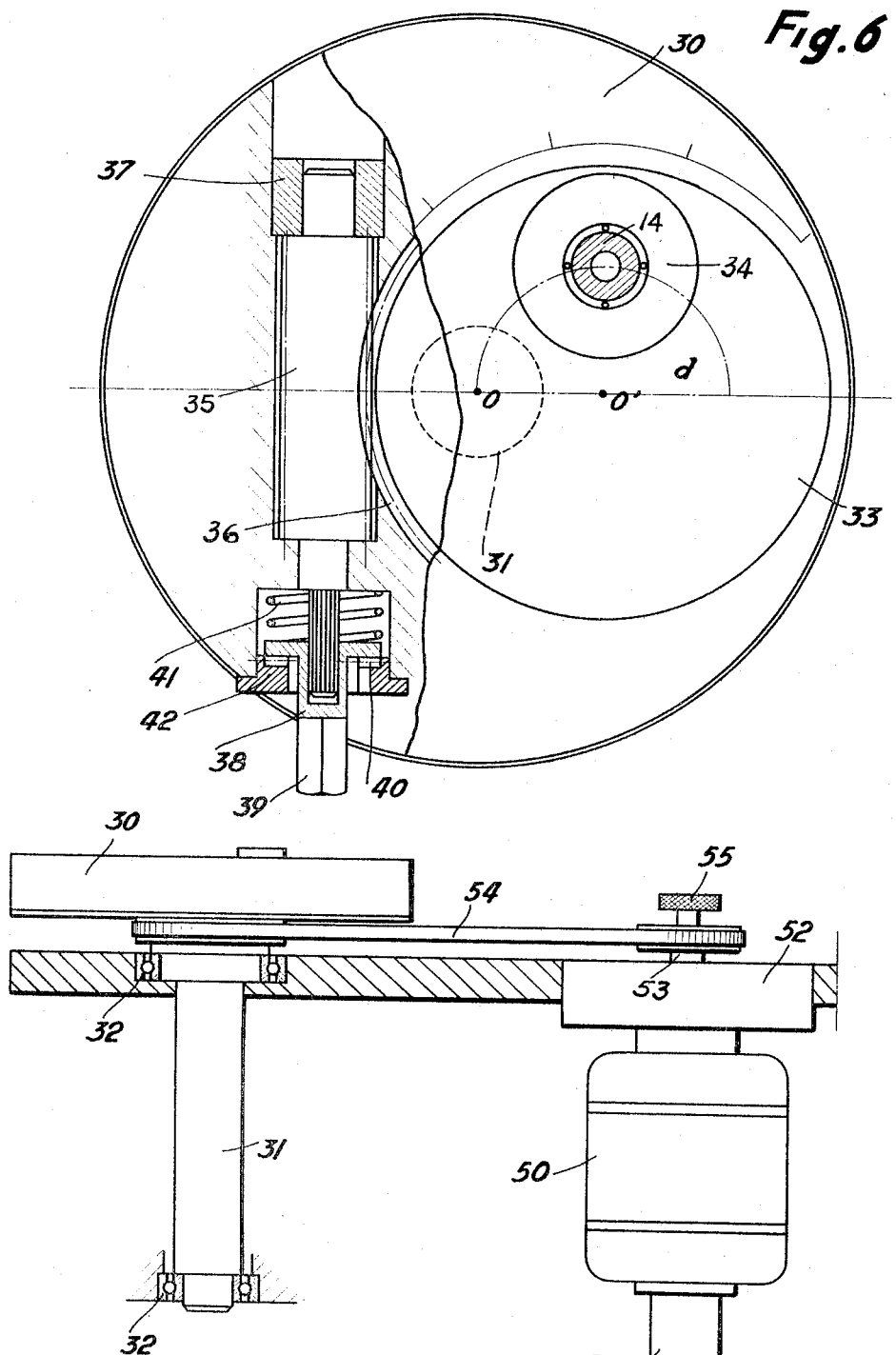

Feb. 21, 1967  J. P. R. RODALLEC  3,304,763
CONICAL-MOTION TESTING MACHINES
Filed April 21, 1964  4 Sheets-Sheet 4
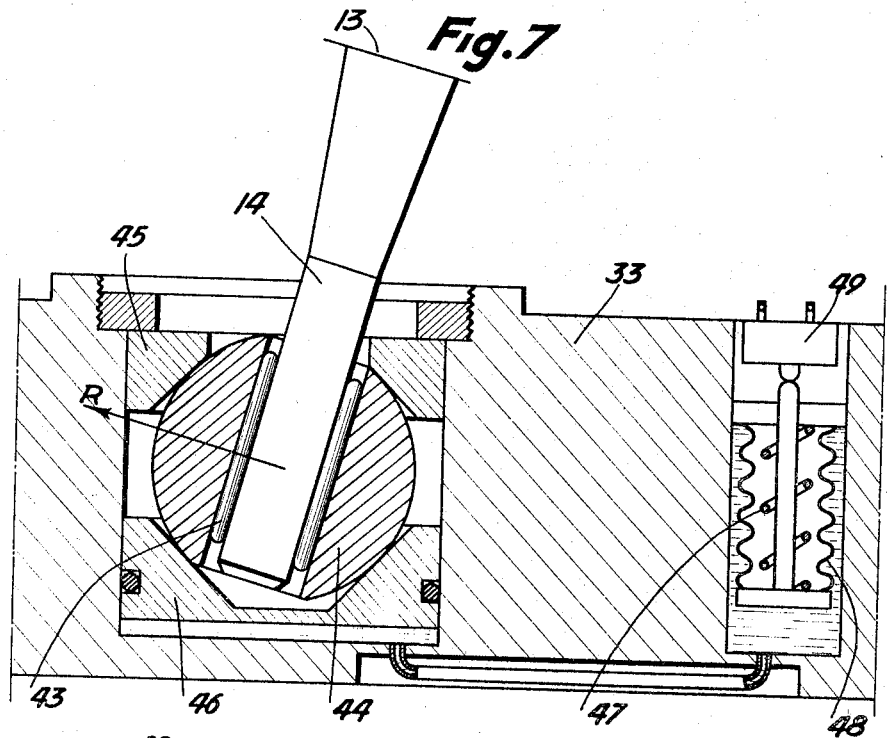
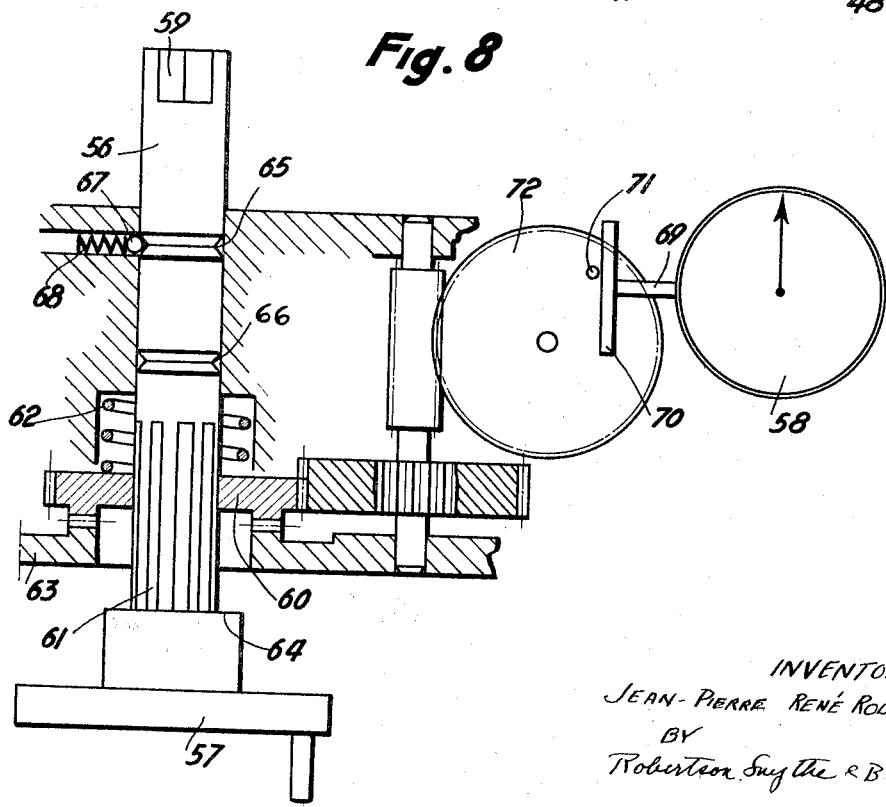
INVENTOR
JEAN-PIERRE RENÉ RODALLEC
BY
Robertson Smythe & Bryan
ATTORNEYS United States Patent Office 3,304,763
Patented Feb. 21, 1967

3,304,763
CONICAL-MOTION TESTING MACHINES
Jean Pierre René Rodallec, Annecy, France, assignor to Societe Anonyme: Societe Alsacienne de Constructions Atomiques de Telecommunications et d'Electronique "Alcatel," Paris, France, a corporation of France
Filed Apr. 21, 1964, Ser. No. 361,349
Claims priority, application France, Apr. 26, 1963, 932,919
9 Claims. (Cl. 73—1)

The present invention relates to a conical-motion testing machine, i.e. to a testing machine adapted to subject to a conical motion, as defined hereinafter, guiding equipments such as gyroscopes, navigational stations and the like.

In the following, the expression "conical motion" designates a motion wherein a point of the unit under test— generally its centre of gravity—remains stationary whereas a straight line passing through said point describes at a given speed a cone having a given, comparatively small, apex angle, the orientation of the unit remaining however unchanged at each revolution.

It is an object of the invention to provide a machine adapted to impart a motion of this kind to the equipment tested.

The machine according to the invention comprises essentially a highly stable shock-absorbing frame structure; a container located at the upper side of said framework and adapted to accommodate the equipment to be tested, said container being rockingly mounted about a stationary point embodied by said cotnainer which forms a large-sized fluid ball joint assembly the mobile or ball portion of which is extended by a cone-shaped member provided at its apex with a pin connected fly-wheel and effecting an eccentrically variable rotary motion.

The container comprises an upper half-sphere, having at least one wide aperture enabling the visual observation of the equipment under test, and a lower half-sphere constituting the movable or ball part of the ball joint assembly and pivotally mounted in a spherical bearing or socket portion formed in a stationary support integral with the frame structure, both half-spheres being formed with flanges enabling them to be coupled together by means of screws or the like.

The lower half-sphere is extended at its base by the preferably hollow, conically shaped driving member which traverses passes through an opening provided in the spherical bearing of the stationary support.

The ball joint assembly is fed with a pressure fluid creating, between the lower half-sphere and the spherical bearing, a fluid film of a few tenths of a millimeter thick.

The conical driving member of the container is itself driven by a horizontal fly-wheel formed with bore which is eccentrically located with respect to the axis and contains an eccentering wheel formed with a recess accommodating a bearing, in which engages the extension pin of said conical member, the eccentering or eccentricity of said pin being adjustable, at will, by suitably rotating the eccentering wheel.

The rotation of the eccentering wheel is preferably achieved by means of teeth peripherally provided thereon and meshing with a worm screw accommodated in the fly-wheel and adapted to be actuated from outside thereof by means of a device comprising a dial comparator which enables an accurate observation of the eccentering value established.

The bearing accommodating the pin of the driving conical member may be formed of a pair of opposed semi-spherical or conical bearings, one of which is secured and the other is movable within the recess in the eccentering wheel, and of a spherical member mounted between the bearings of said pair, said spherical member having a diametrical bore in which said pin is rotatably mounted by means of a needle bearing or the like, the movable bearing in said pair being subjected to a constant thrust of a pressure fluid, thus eliminating any play in the bearing.

The equipment to be tested is placed inside a cradle assembly formed of two spherically-edged ring members attached to each other by means of cross-bars and formed with openings for allowing the equipment to be inserted, said cradle being clamped between the upper half-sphere and the lower half-sphere of the container.

Bores formed in the cradle cross-bars may receive axes fitted with roller bearings capable of rocking on an annular support placed between the cradle and the lower half-sphere of the container, in order to provide for the balancing of the load.

A preferred embodiment of the invention is described hereinafter with reference to the appended drawings, in which:

FIGURE 1 is a vertical sectional view of the essential part of the machine according to the invention.

FIGURE 2 is a cross-sectional view of the cradle assembly.

FIGURE 3 is a plan view corresponding to FIG. 1.

FIGURE 4 is a diagram of the pressure fluid flow circuit.

FIGURE 5 is a side elevational, part sectional view of the driving mechanism of the machine.

FIGURE 6 is a plan view of the fly-wheel, at an enlarged scale.

FIGURE 7 is a partial, radial sectional view of a detail of the fly-wheel at a still larger scale.

FIGURE 8 is a diagrammatic, part sectional view of a device for varying and indicating the eccentration of the container movement.

Referring first to FIGURE 1, the machine comprises a container 1 adapted to accommodate the equipment to be tested. Said container includes two hollow half-spheres 1a, 1b, made of a light alloy. The lower half-sphere constitutes the mobile elements of a ball joint assembly, whereas the upper half-sphere or lid, 1b is widely apertured in order to allow the equipment under test to be visually observed and optical measurements to be made. The lid 1b is secured on the lower half-sphere 1a by means of screws 2.

The equipment to be tested 3 is secured inside a cradle assembly 4 formed of two ring members 4a and 4b assembled together by means of cross-bars 5. Said ring members are spherically shaped on their outer profile the radius of the spherical portions being the same as the inner radius of the two half-spheres 1a and 1b forming the container.

It is thus possible to give the equipment 3 any desired orientation within the container before starting the testing operations. Screws 2 securing lid 1b to half-sphere 2b are then tightened by means of a torque wrench, thus interlocking together cradle assembly 4, and therefore the equipment 3, and the container 1.

The torque load placed on screws 2 is determined in such a manner that for any given frequency of the testing range there will be no relative movement of the elements mentioned above.

In cross-bars 5 of cradle 4 (FIGURE 2) accommodating the equipment 3, four bores 6 are formed by machining, defining two axes of intersection crossing in the centre 0 of the ball joint assembly when the cradle is located in container 1.

The said bores 6 are adapted to receive trunnions 7 provided with ball bearings 8 for balancing the load. The center of gravity of said load is shifted onto the pivoting center, either by adjusting the position of the load within cradle 4 or by adding weights to said cradle.

This balancing may be achieved on the machine itself through a support 9 inserted between cradle 4 and the lower half-sphere 1a.

On container 1 (FIGURE 3) are secured, at four suitable points, eight resilient braces or stays 10 fixedly attached, at their other end, at four points 11, onto framework 12 of the machine.

The said braces or stays 10, owing to their resilience, enable container 1 to effect a conical motion, while opposing to its rotation about the vertical axis x–x'.

The lower half-sphere 1a (FIGURE 1) has an extension formed as a hollow conically-shaped driving member 13, made of a light alloy material, and produced by a rolling operation in order to present a maximum rigidity for a minimum of weight, i.e. of inertia. At the apex of cone member 13 is secured a pin 14 of hardened steel, which is adapted to be driven by the mechanism to be described hereinafter.

The dimensions of the various moving parts, more particularly the length of the driving cone member, must be determined in such a manner as to cancel or reduce at a minimum the reaction, more particularly the rotating reaction having its point of application in the center of the ball joint assembly.

This fluid ball assembly (FIGURE 1) comprises the lower half-sphere 1a of container 1 oscillating in support 12, the inner shape of which is equally that of a sphere with the same radius.

Said support 12 may be of cast iron or of any other material with similar characteristics.

These parts must be perfectly spherically shaped, presenting no shape or surface imperfection, which may be achieved by a precision machining after stabilizing the metal, followed by a grinding in operation of the pieces into one another, with the help of a suitable grinding product.

In the spherical bearing of the cast-iron support 12 are machined a plurality of cavities such as 15 (FIGURE 1), into which is admitted a pressure fluid, which may be oil, and which gives rise, between the moving parts, to a fluid film of a few tenths of a millimeter thickness. Thus a certain rigidity is obtained in the suspension arrangement, both in the vertical and in the transverse direction.

The flow circuit of the fluid, as shown in FIGURE 4, is as follows:

A motor-pump 16 takes in fluid from a tank 17 through a filter 18 and feeds the cavities 15 of support 12 through a manifold 19 connected to ducts 20 formed within said support 12.

The fluid discharged from the ball joint assembly at the lower end of half-sphere 1a (FIGURE 1) falls back into an annularly shaped piece 21 serving as a recovery chamber, from which it is recycled into tank 17 through a duct 22.

The driving cone member 13 (FIGURE 1) is fitted at its base with a baffle 23 preventing outward fluid projections.

At the upper surface of support 12 the fluid is collected in a gutter 24 and guided into the recovery chamber 21 through ducts 25 formed in said support.

A bellows 26, made of leather or of any other suitable flexible material, prevents any foreign bodies and dust from being introduced into the circuit.

In addition, the pressure fluid circuit of FIGURE 4 comprises a minimum pressure switch 27 and an oleo-pneumatic accumulator 28 connected to the outlet duct of pump 16, a non-return valve 29 being inserted between said accumulator 28 and said minimum pressure switch 27 is adapted, in a known manner, to prevent the starting of the motor (hereafter described) which drives the machine, as long as the required pressure is not reached and to stop said motor in case of an accidental drop of the pressure. Accumulator 28 forms a pressure-fluid storage tank adapted to feed the ball joint assembly during the time required for the rotation of the machine to stop completely in the event of a pressure or electric current failure.

The driving and eccentering of cone member 13 are obtained by means of a mechanism forming a unit mounted on a frame which is rigidly secured to the lower part of framework 12, but which is readily detachable in view of its being disassembled if necessary (FIGURE 5). The particular connection means therefor have not been shown.

The said unit comprises a fly-wheel 30 mounted on a shaft 31 journalled in two high-precision roller bearings 32. The axis of shaft 31 is vertical and in alignment with axis xx' of the ball joint assembly.

Said fly-wheel 30 (FIGURE 6) is provided with a bore eccentered relative to the axis of shaft 31 by a distance $d=00'$ and in which is arranged a wheel 33 hereafter called eccentering wheel.

Said wheel 33 is formed with a cylindrical recess the axis of which is parallel to that of the eccentering wheel and at a distance $d$ therefrom, said recess accommodating a bearing 34 in which revolves pin 14 of the driving cone member 13.

By causing the eccentering wheel 33 to rotate relative to fly-wheel 30 from the position in which the axis of bearing 34 is at point 0 to the opposite position on line 00', i.e. half a revolution, the eccentering of pin 14 of the cone member with respect to axis xx' (FIG. 1) will gradually vary from zero to $2d$.

The amplitude of the conical movement of container 1 will therefore vary from zero to a maximum angle. This adjusting movement is obtained by means of a worm-screw 35 journalled in fly-wheel 30 and which meshes with teeth 36 cut out on the periphery of eccentering wheel 33. Thus, a high gear ratio is obtained which enables an accurate adjustment of the amplitude.

Worm gear 35 is fitted with a play-compensating ring 37 and with a locking system adapted to prevent its accidental rotation after adjustment, which may occur under the effect of the reactions due to the movement. To this end, worm-gear 35 is provided with a longitudinally grooved extension engaged in a correspondingly grooved hollow stud 38 having a square driving head 39 and provided with a flange 40 formed with gullet teeth and urged by a spring 41 against corresponding teeth provided in a closing member 42 through which extends said stud 38. The rotation of the worm-gear 35 is thus positively prevented.

During the adjustment, which is of course carried out when fly-wheel 30 is at rest, the driving square-head 39 of stud 38 is first pushed back, releasing the gullet teeth, and then caused to rotate the number of revolutions required.

Bearing 34, which accommodates pin 14 of cone member 13, is of the ball joint type, adapted to be eccentered when required, and constructed as illustrated in FIGURE 7.

Pin 14 of driving cone member 13 revolves in a needle bearing 43 mounted in a bronze sphere 44. The latter may oscillate, according to the adjusted amplitude, between two conical bearing members 45 and 46 of hardened steel. Bearing member 45 is stationary, while bearing member 46 is urged by oil pressure. This pressure is produced by a spring 47 acting on a bellows 48 and designed in such a manner that when the reaction R of axis 14 on ball joint 44 exceeds a certain value, the movement of the lower bearing member 46, transmitted at an amplified rate to bellows 48, actuates a micro-switch 49 adapted to cut off the supply of the driving motor of fly-wheel 30.

The above described unit is located in the eccentering wheel 33, the continuity of the electric circuit between the micro-switch and the motor being maintained by a connector (not shown) rotating on the axis of fly-wheel 30.

The drive of fly-wheel 30 is provided by a motor assembly mounted on the same frame and which comprises (FIGURE 5) a D.C. motor 50 driven by an electronic speed changer, a tachometer generator 51 for the speed regulation, and a double-ratio gear box 52.

The linking between the output shaft 53 of gear-box 52 and fly-wheel 30 is provided by a notched belt 54, in order to avoid slipping.

The engagement of one or of the other of the speeds is effected by a manual clutch unit controlled by means of a knurled button 55.

On the framework of the mechanism is arranged a device for the control of the eccentering, which comprises essentially, as illustrated in FIGURE 8, a rotating spindle 56 fitted with a crank-handle 57 and a dial carrying a scale in milli-radians.

For adjusting the eccentering, the square-headed driving pin 39 of the worm-screw 35 of fly-wheel 30 is brought, by rotation, to face spindle 56 which is fitted, at its end, with a female square-head 59.

Fly-wheel 30 is then pushed in such a manner that the male square-head 39 penetrates into the female square-head 59, and crank handle 57 is rotated while observing the eccentering value on dial 58.

When this adjustment operation is achieved, spindle 56 is reset into its initial position. It is however desirable that a safety system be provided to prevent an accidental starting of the movement in the event said spindle remains in engagement. In the same way, the rotation of spindle 56 must only be possible when the latter meshes with the worm-screw 35, in order to avoid any accidental disarrangement of the reading system.

To this end, a gear wheel 60 having gullet teeth cut radially in one side is rotatingly linked with spindle 56 by means of grooves 61; said wheel may be moved axially and is urged by a spring 62 against corresponding gullet teeth provided in a stationary member 63, thus providing a locking against rotation.

When spindle 56 is moved forward for adjustment purposes, it will remain locked against rotation up to the moment when shoulder 64 engages wheel 60 and causes the disengagement of the gullet teeth thereof and those of member 63.

The two positions of spindle 56 are defined by two grooves 65 and 66 in which may engage a ball 67 urged by a spring 68.

The reading of the eccentration, i.e., of the amplitude of the movement, is effected on a linearily scaled comparator, although it is a sinusoidal function of the angle $\alpha$ through which revolves the eccentering wheel 33 during the adjustment operation; calling $e$ the eccentration of the axis, then:

$$e = 2d \sin \alpha/2$$

where angle $\alpha$ varies from 0 to $\pi$ and $e$ from 0 to $2d$.

Rod 69 of the comparator is fitted at one end with a flat contact 70 which is adapted to apply onto a contact stud 71 integral with a wheel 72.

Said wheel 72 is rotated by spindle 56, the gear ratio being provided by wheel 60, a wheel 73 and a worm-screw 74. The reduction ratio is such that, when the eccentering wheel 33 of fly-wheel 30 rotates by $\alpha$, said wheel will rotate by $\alpha/2$.

The movement of comparator 50 is therefore proportional to sin $\alpha/2$, i.e., to the eccentration.

What I claim is:

1. A conical-motion testing machine comprising a highly stable shock absorbing frame structure, a container for carrying a work piece to be tested, said container being composed of an upper hollow semi-sphere portion apertured to enable visual observation of the work piece being tested and a lower hollow semi-sphere portion complemental to said upper semi-sphere portion, means for rigidly coupling said sphere portions together, said frame having a socket portion having a central aperture and rockingly mounting said lower sphere portion about a fixed point of said container, fluid joint means between said lower hollow semi-sphere portion and said socket portion, a hollow cone-like driving member extending from said lower sphere portion and having an axial pin adjacent its apex portion, fly-wheel means, an adjustable eccentric means for engaging said axial pin to drive said cone-like member, said eccentric means being carried by said fly-wheel means, and means for adjusting the eccentricity of said pin relative to the center of said fly-wheel means.

2. A testing machine according to claim 1 wherein said lower half-sphere is extended at its lower part by a hollow cone driving member traversing the socket portion of the stationary support.

3. A testing machine according to claim 2 including means for feeding pressure fluid between the lower half-sphere and the socket portion so as to create a fluid film in the range of a few tenths of a millimeter in thickness.

4. A testing machine according to claim 1 including recess means in said fly-wheel means eccentered relative to the axis of the fly-wheel means, an eccentering wheel with a bearing thereon having a cavity means for engaging said axial pin, and means for adjusting the eccentricity of said bearing by rotating the eccentering wheel.

5. A testing machine according to claim 4 including peripheral teeth on said eccentering wheel, means journaled in said fly-wheel means including a worm-screw engaging said teeth, means for rotating said means journaled in said fly-wheel means, and dial comparator means connected to said last-mentioned means.

6. A testing machine according to claim 4 wherein said bearing is composed of a pair of socket means, one of which is movable within said recess and the other is stationary therein, a ball joint means having an aperture therein with needle bearing means therein for receiving said axial pin, said ball joint being carried by said pair of socket means, and a pressure fluid system connected to said pair of socket means to subject the same thereto, and safety means responsive to said last-mentioned pressure fluid system for deactivating the drive for said fly-wheel means when the reaction force of said axial pin thereon exceeds a predetermined value.

7. A testing machine according to claim 1 and including brace members secured to said container and to said frame respectively, so as to enable the container to effect a conical movement and to prevent a rotating movement thereof about its vertical axis.

8. A testing machine according to claim 1 and including a cradle structure to hold the work piece being tested, said cradle structure comprising two spherically edged rings attached to each other by cross-bars, said cradle structure having openings for reception of the work piece, said cradle structure being clamped between the upper half-sphere and the lower half-sphere of said container.

9. A testing machine according to claim 8 wherein said cross bars have bores therein, ball bearings in said bores, pins in said ball bearings, an annular support located between said cradle structure and said lower half-sphere so as to provide for balancing.

References Cited by the Examiner

UNITED STATES PATENTS 1,779,981 10/1930 Nickerson _____ 74—600
3,092,918 6/1963 Haeussermann et al. ____ 73—1
3,158,018 11/1964 Edwards et al. _____ 73—1

FOREIGN PATENTS 1,258,896 3/1961 France.

LOUIS R. PRINCE, *Primary Examiner.*

S. C. SWISHER, *Assistant Examiner.*